US012606246B2

(12) United States Patent (10) Patent No.: US 12,606,246 B2
Brymerski (45) Date of Patent: Apr. 21, 2026

(54) FASTENING ARRANGEMENT WITH A VEHICLE ROOF-FRAME STRUCTURE AND A ROOF MODULE

(71) Applicant: AUDI AG, Ingolstadt (DE)

(72) Inventor: Wojciech Brymerski, Kornwestheim (DE)

(73) Assignee: AUDI AG, Ingolstadt (DE)

( * ) Notice: Subject to any disclaimer, the term of this patent is extended or adjusted under 35 U.S.C. 154(b) by 380 days.

(21) Appl. No.: 18/547,386

(22) PCT Filed: Feb. 22, 2022

(86) PCT No.: PCT/EP2022/054326
§ 371 (c)(1),
(2) Date: Aug. 22, 2023

(87) PCT Pub. No.: WO2022/223176
PCT Pub. Date: Oct. 27, 2022

(65) Prior Publication Data
US 2024/0124061 A1 Apr. 18, 2024

(30) Foreign Application Priority Data

Apr. 19, 2021 (DE) ......................... 102021109725.8

(51) Int. Cl.
*B62D 25/06* (2006.01)
*B62D 21/15* (2006.01)
(Continued)

(52) U.S. Cl.
CPC ........... *B62D 21/157* (2013.01); *B62D 25/06* (2013.01); *B62D 27/026* (2013.01);
(Continued)

(58) Field of Classification Search
CPC ..... F16B 31/021; B62D 21/157; B62D 25/06; B62D 27/026; B62D 27/065; B62D 27/023
(Continued)

(56) References Cited

U.S. PATENT DOCUMENTS 4,475,765 A * 10/1984 Vogt ..................... B62D 29/048
428/116
5,713,705 A * 2/1998 Grunbichler .......... F16B 31/021
411/910
(Continued)

FOREIGN PATENT DOCUMENTS

CN 209142235 U 7/2019
DE 4324675 A1 1/1994
(Continued)

OTHER PUBLICATIONS

English translation of DE102009004479A1; https://translationportal.
epo.org; Oct. 15, 2025 (Year: 2025).*
(Continued)

*Primary Examiner* — Roger L Pang
(74) *Attorney, Agent, or Firm* — Maier & Maier, PLLC

(57) ABSTRACT

A fastening arrangement with a roof-frame structure of a vehicle and a roof module, the roof-module carrier of which, in the assembled state, is adhesively bonded to an adhesive flange of the roof-frame structure with an interposed adhesive. The roof-module carrier is additionally connected to the adhesive flange of the roof-frame structure by a screw connection in which the roof-module carrier is firmly clamped to the adhesive flange of the roof-frame structure by at least one fastening screw. To avoid contact corrosion and/or to reduce the component weight, the fastening screw is made from plastic.

19 Claims, 4 Drawing Sheets

Section A-A

Section B-B

(51) Int. Cl.

| | | |
|---|---|---|
| *B62D 27/02* | (2006.01) | |
| *B62D 27/06* | (2006.01) | |
| *B62D 65/02* | (2006.01) | |
| *F16B 31/02* | (2006.01) | |

(52) U.S. Cl.
    CPC ......... *B62D 27/065* (2013.01); *B62D 65/024* (2013.01); *F16B 31/021* (2013.01)

(58) Field of Classification Search
    USPC ............................................ 296/187.13, 210
    See application file for complete search history.

(56) References Cited

U.S. PATENT DOCUMENTS

| | | | | |
|---|---|---|---|---|
| 6,409,258 | B1 * | 6/2002 | Grimm | ................... B60J 7/022 |
| | | | | 296/210 |
| 2018/0170451 | A1 * | 6/2018 | Terada | ................. B62D 27/026 |

FOREIGN PATENT DOCUMENTS

| | | | |
|---|---|---|---|
| DE | 4313555 | C1 | 5/1994 |
| DE | 19619087 | A1 | 11/1997 |
| DE | 10249418 | A1 | 5/2004 |
| DE | 10254573 | A1 | 5/2004 |
| DE | 10249418 | B4 | 3/2007 |
| DE | 102009004479 | A1 | 7/2010 |
| DE | 102010031774 | A1 * | 3/2011 ............. B62D 25/06 |
| DE | 102016114988 | A1 | 2/2018 |
| DE | 502018000272.5 | | 10/2019 |
| EP | 1559600 | A2 | 8/2005 |
| EP | 3388269 | A1 | 10/2018 |
| WO | 2021008728 | A1 | 1/2021 |

OTHER PUBLICATIONS

English translation of DE102010031774A1; https://translationportal.epo.org; Oct. 15, 2025 (Year: 2025).*
"Plastic screw made of polyamide with glass fiber reinforcement", Kunststoffe.de, Jun. 27, 2016, 6 pages.
Examination Report issued on Dec. 6, 2021, in corresponding German Application No. 102021109725.8, 8 pages.
International Search Report and Written Opinion issued on May 20, 2022, in corresponding International Application No. PCT/EP2022/054326, 21 pages.
International Preliminary Report on Patentability issued on Oct. 24, 2023, in corresponding International Application No. PCT/EP2022/054326, 18 pages.

* cited by examiner

Section A-A

Section B-B

FASTENING ARRANGEMENT WITH A VEHICLE ROOF-FRAME STRUCTURE AND A ROOF MODULE

FIELD

The invention relates to a fastening arrangement with a roof-frame structure of a vehicle and a roof module.

BACKGROUND

The vehicle body of a two-track vehicle has a roof support structure on which a roof module can be mounted. This can be kept as a separate pre-assembly unit. Depending on the vehicle variant to be produced, the roof module can be a full-roof sheet part spanning the body roof side with a completely closed surface to form a full-roof vehicle variant. Alternatively, the roof module can be a sliding roof module to form a sliding roof vehicle variant or a panoramic roof module to form a panoramic roof vehicle variant.

A generic fastening arrangement has a roof-frame structure and a roof module. In the assembled state, its roof module carrier is supported on an adhesive flange of the roof-frame structure with an adhesive layered in between and is thus in an adhesive bond. In addition, the roof module carrier is connected to the adhesive flange of the roof-frame structure by a screw connection, in which the roof module carrier is firmly clamped to the adhesive flange of the roof-frame structure by means of fastening screws.

In the prior art, the fastening screws are implemented as metal screws. In order to avoid contact corrosion in connection with the metal vehicle body shell, the metal screws have a suitable surface protection that is complex in terms of production technology, for example a zinc flake coating, or they are made of stainless steel. In addition, the use of such metal screws is associated with a high component weight.

An intermediate element for a vehicle roof and a fastening arrangement for a vehicle roof are known from EP 3 388 269 A1. DE 102 54 573 A1 discloses a precisely spaced assembly of a roof module with a vehicle body. A body element for a vehicle is known from DE 102 49 418 B4. A vehicle roof arrangement is known from EP 1 559 600 A2. DE 10 2016 114 988 A1 discloses a fastening element with a blade-like penetration device. A fastening device is known from DE 196 19 087 A1. DE 43 24 675 A1 discloses a roof opening device with a wind deflector.

SUMMARY

The object of the invention is to provide a fastening arrangement with a vehicle roof-frame structure and a roof module which, compared to the prior art, has a reduced component weight and/or is constructed to be corrosion-resistant in a simple manner.

The invention is based on a fastening arrangement in which a roof module carrier in the assembled state is supported on an adhesive flange of the vehicle roof-frame structure with an interposed adhesive layer and is thus adhesively bonded thereto. In addition, the roof module carrier is connected to the adhesive flange of the roof-frame structure by a screw connection, in which the roof module carrier is firmly clamped to the adhesive flange of the roof-frame structure by means of at least one fastening screw. The fastening screw is made of plastic to avoid contact corrosion in the screw connection and/or to reduce the component weight (compared to a conventional metal screw). The plastic can be made of thermoplastic material such as polyamide, polyphthalamide or other engineering plastic. Alternatively, the plastic may be made from a thermosetting material such as epoxy, polyester, vinyl ester, or the like. To increase the rigidity or strength, in particular to provide a fastening screw with a high strength class, a fiber-reinforced plastic can be used in which reinforcing fibers, in particular glass fibers, are embedded in the plastic material. For example, the proportion of fiber reinforcement can be 50% (mass percent). Such fiber reinforcement leads to better rigidity or strength of the screw, which must be tightened with at least 2 to 3 Nm in order to fix the roof module to the roof-frame structure (in particular in the vertical direction of the vehicle).

In a technical implementation, the adhesive flange of the roof-frame structure can protrude towards the inside of the vehicle and/or be aligned in a horizontal plane. The adhesive flange can essentially be designed in an encircling manner in the manner of a frame. In the same way, the roof module carrier can also be designed as a substantially frame-like closed reinforcement frame, which is supported on the adhesive flange both by an adhesive connection and by a screw connection.

In the screw connection, the screw axis of the fastening screw can be aligned, in particular, in the vertical direction of the vehicle. In the assembled state, the fastening screw can be guided with its screw shank through a screw hole in the adhesive flange and through a screw hole in the roof module carrier and screwed to a screw nut, in particular a pierce nut. In this way, the adhesive flange and the roof module carrier can be clamped between the screw head of the fastening screw and the nut.

In a specific embodiment, the roof frame structure may include a roof frame longitudinal beam extending in the vehicle longitudinal direction. The roof-frame longitudinal beam may be composed of a cup-shaped vehicle inner sheet part, a cup-shaped vehicle outer sheet part, and an outer skin sheet part covering the outer sheet part. The outer sheet part, the inner sheet part and the outer skin sheet part can be joined together with their vehicle-internal longitudinal flanges to form a flange connection. The flange connection forms the adhesive flange on which the roof module can be supported.

In the vehicle body shell, the roof-frame longitudinal beam is part of a vehicle side structure into which a crash force can be introduced in the event of a side crash. The production of the fastening screw from plastic material is advantageous in the event of a side crash for the following reason: the plastic screw has reduced shearing strength compared to a conventional metal screw. In the event of a side crash, the fastening screw can therefore act as a predetermined breaking point, which shears off or breaks early in the course of the crash. In this way, the roof module can detach from the roof-frame of the vehicle roof at an early stage in the course of the crash, which has a favorable effect on the course of the crash.

With regard to a perfect adhesive connection, spacers can be positioned between the adhesive flange and the roof module carrier, which ensure a predefined layer thickness of the adhesive. The assembly of the roof module with the roof-frame structure can be carried out in the process sequence described below: in a first process step, the roof module is provided as a separate pre-assembly unit, on the roof module carrier of which the adhesive is applied, for example a 2-component PUR window adhesive, which is soft and not yet hardened, that is not dimensionally stable. In a second process step, the roof module is positioned on the adhesive flange in a predefined final assembly position. This is followed by a third process step, in which the roof module is screwed to the adhesive flange of the roof-frame. During the hardening phase of the adhesive, the screw connection acts to secure the position of the roof module in the vertical direction of the vehicle. After the adhesive connection has hardened, the screw connection has essentially no function since the connection strength between the roof module and the adhesive flange is ensured by the hardened adhesive connection.

BRIEF DESCRIPTION OF THE FIGURES

An exemplary embodiment of the invention is described below by means of the appended figures. In the figures.

DETAILED DESCRIPTION

Figure 1:
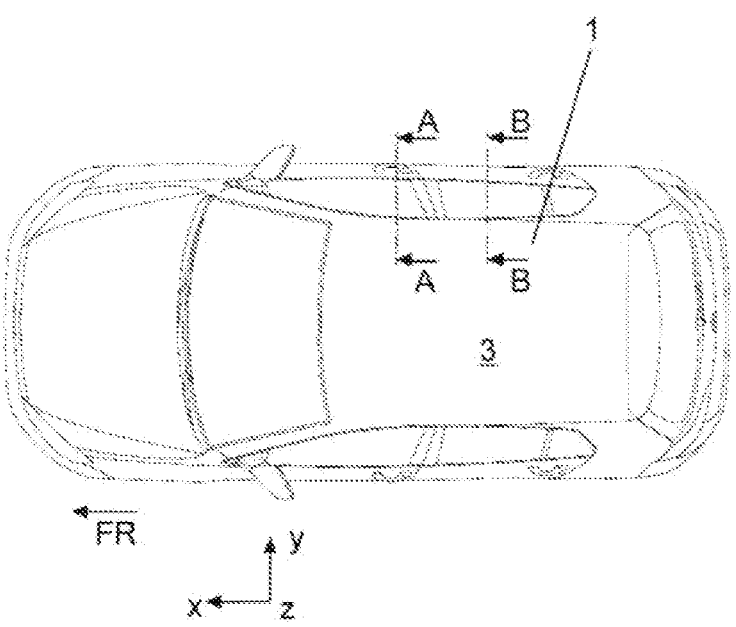
FIG. 1 shows a vehicle in a view from above.
Figure 2:
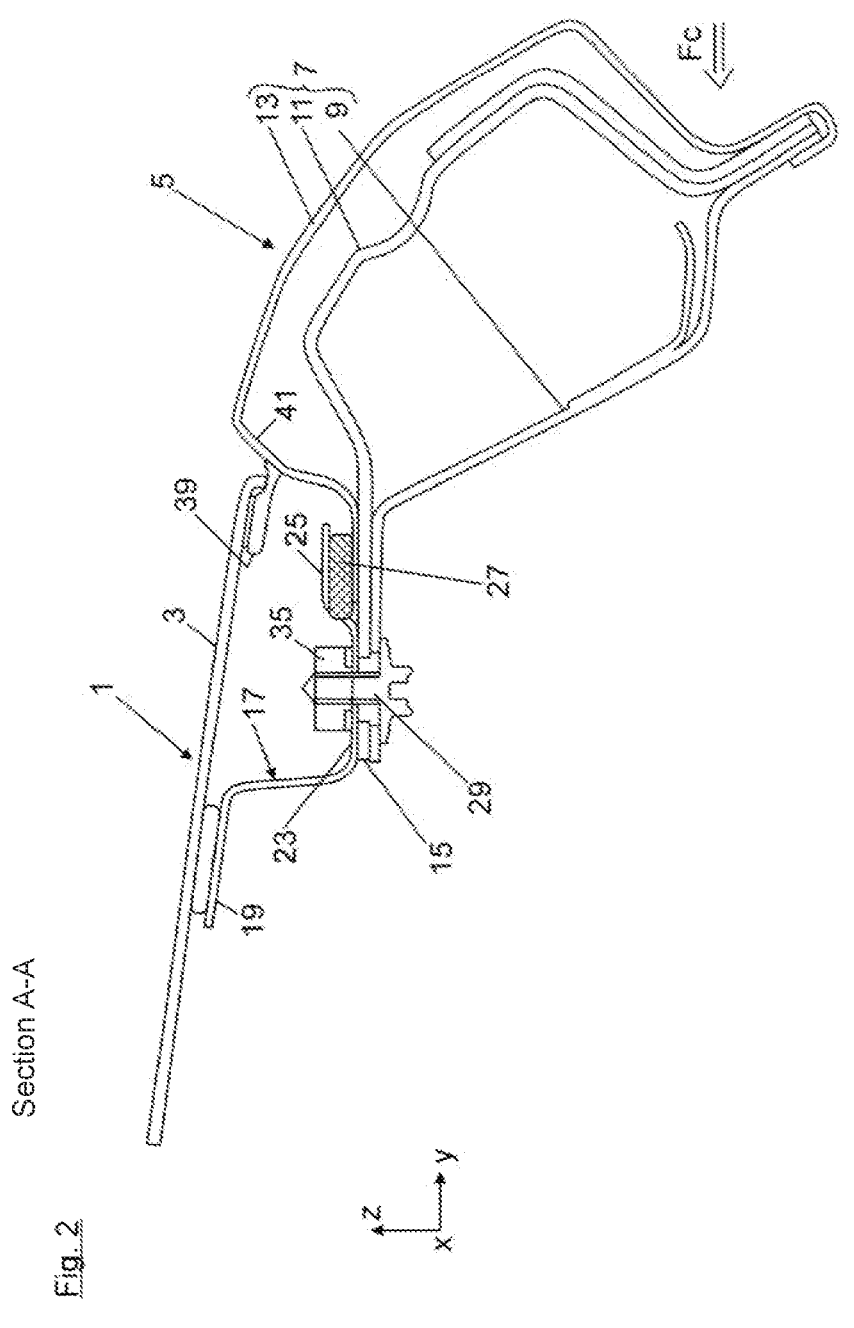
FIG. 2 shows partial sectional views along the sectional planes A-A from FIG. 1.
Figure 3:
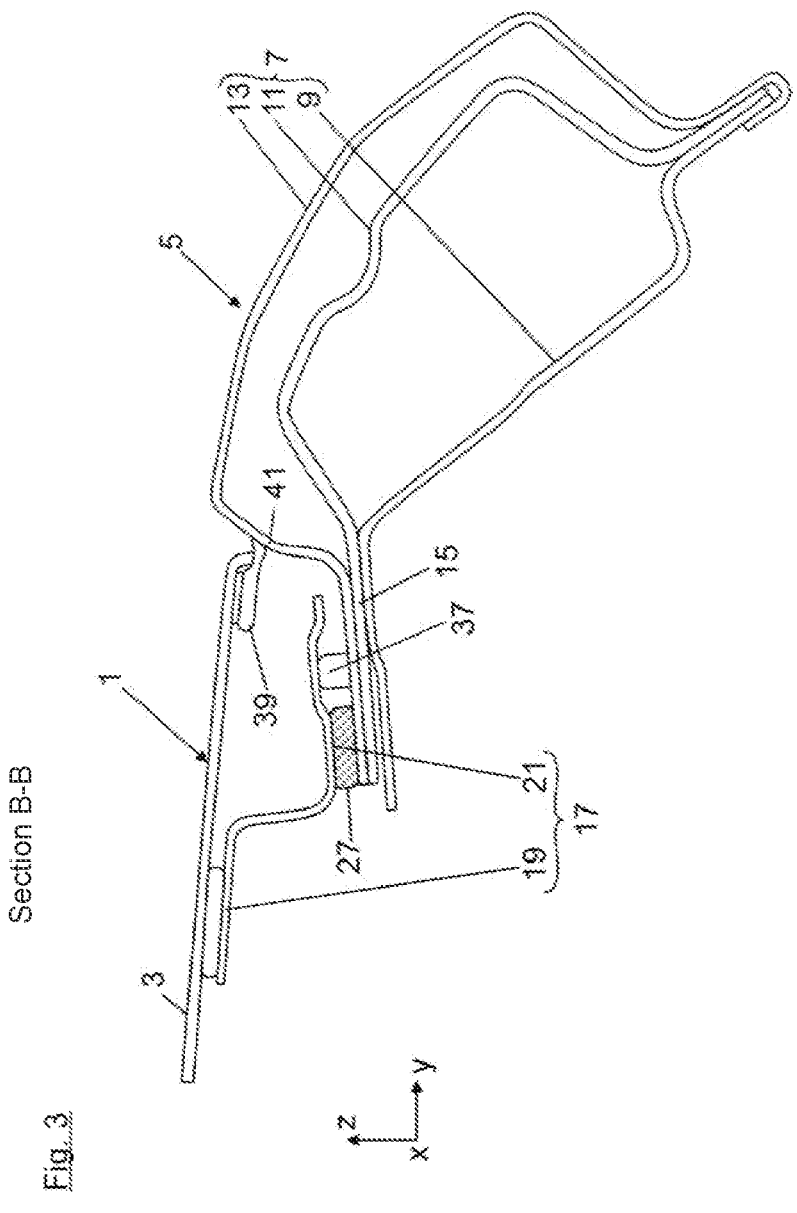
FIG. 3 shows partial sectional views along the sectional planes B-B from FIG. 1.
Figure 4:
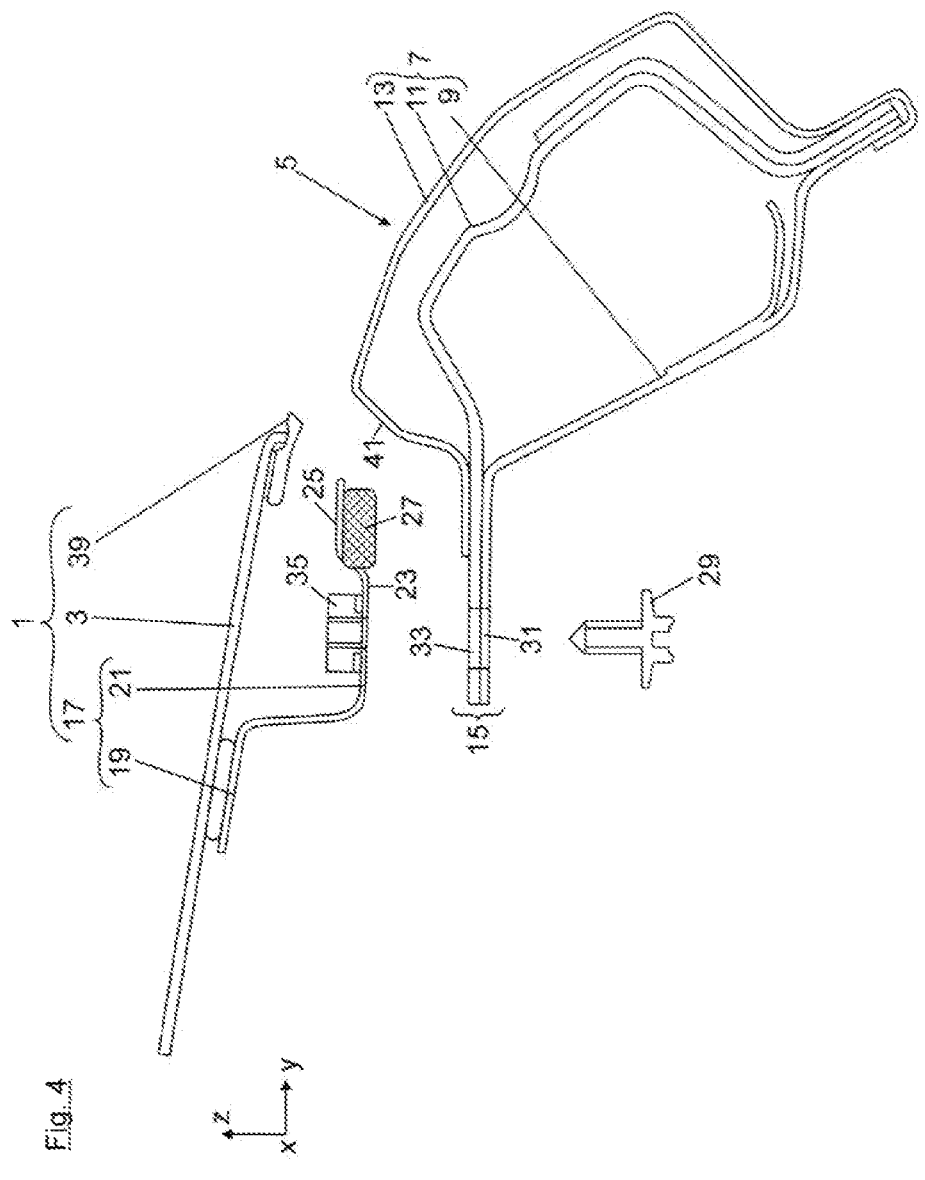
FIG. 4 shows a fastening arrangement in an exploded view.

FIG. 1 shows a motor vehicle on the roof side of which a roof module 1 with a closed-surface full-roof sheet part 3 made of CFRP, for example, is installed, which part completely spans the vehicle roof side. The roof module 1 is mounted on a body-side roof-frame structure 5, of which a lateral roof-frame longitudinal beam 7 is shown respectively in FIGS. 2 to 4, which beam extends in the vehicle longitudinal direction x. In FIGS. 2 to 4, the roof-frame longitudinal beam 7 has a cup-shaped inner vehicle sheet part 9, a cup-shaped outer vehicle sheet part 11 and a outer skin sheet part 13 which covers the outer sheet part 11. The outer sheet part 11, the inner sheet part 9 and the outer skin sheet part 13 are joined together at their longitudinal flanges inside the vehicle to form a flange connection. This forms an adhesive flange 15 on which a reinforcement frame 17 of the roof module 1 is supported.

In FIG. 2, the reinforcement frame 17 is shown in cross-section, with an upper vehicle support leg 19, which is adhesively bonded to the full roof sheet part 3, and a lower vehicle support leg 21 (FIG. 3), a support portion 23 of which is in direct contact with the adhesive flange 15. In FIG. 2, the support portion 23 of the reinforcement frame 17 transitions towards the inside of the vehicle, at a step, into an adhesive portion 25. This is spaced from the adhesive flange 15 by an adhesive gap which is filled with adhesive 27. In addition, the roof module 1 is secured to the adhesive flange 15 via a screw connection. The screw connection has a fastening screw 29 which is guided with its screw shank through a screw hole 31 in the adhesive flange 15 and through a screw hole 33 in the reinforcement frame 17 and is screwed to a nut 35 punched into the reinforcement frame 17. In this way, the adhesive flange 15 and the reinforcement frame 17 of the roof module 1 are clamped between the screw head of the fastening screw 29 and the screw nut 35. As can also be seen from FIG. 3, spacers 37 are positioned between the lower vehicle support leg 21 of the reinforcement frame 17 and the adhesive flange 15, one of which is shown in FIG. 3. A predefined layer thickness of the adhesive 27 is ensured with the aid of the spacers 37.

In FIGS. 2 to 4, the full-roof sheet part 3 has an elastically flexible element (so-called zero-joint seal) 39 at the edge, which element projects slightly beyond the edge of the full-roof sheet part 3 to the outside of the vehicle. In the assembled state (FIG. 2 or 3), the elastically flexible element 39 of the full-roof sheet part 3 is in contact with a joining flank 41 of the outer skin sheet part 13.

A process sequence for assembling the roof module 1 on the roof-frame structure 5 of the vehicle is described below with reference to FIG. 4: accordingly, in a first process step, the roof module 1 is provided as a separate pre-assembly unit, on the reinforcement frame 17 of which the adhesive 27 is applied. In a second process step, the roof module 1 is correctly positioned on the adhesive flange 15 of the roof-frame structure 5. This is followed by a third process step, in which the roof module 1 is screwed to the adhesive flange 15 of the roof-frame structure 5. During a hardening phase of the adhesive 27, the screw connection secures the position of the roof module 1 in the vertical direction of the vehicle z. After the hardening has occurred, the screw connection is largely functionless since the connection strength between the roof module 1 and the adhesive flange 15 is largely ensured by the adhesive connection.

A core idea of the invention is that the fastening screw 29 is made of plastic, whereby contact corrosion in the screw connection can be avoided and the component weight of the fastening arrangement can be reduced. In order for the fastening screw 29 to have a sufficiently high strength class, a fiber-reinforced plastic is used in particular, in which short reinforcing fibers, in particular glass fibers, are embedded in a plastic matrix.

In the vehicle body, the roof-frame longitudinal beam 7 is part of a vehicle side structure into which a crash force Fc can be introduced in the event of a side crash (FIG. 2). In view of a favorable outcome of the side crash, the use of plastic for the fastening screw 29 is advantageous for the following reasons: the fastening screw 29 made of plastic has a reduced shear strength compared to a conventional metal screw. In the event of a side crash, the fastening screw 29 can therefore act as a predetermined breaking point, which shears off or breaks early in the course of the crash. In this way, the roof module 1 can detach from the roof-frame structure 5 of the vehicle at an early point in time after a side crash has occurred.

LIST OF REFERENCE NUMERALS 1 roof module
3 full-roof sheet part
5 roof-frame structure
7 roof-frame longitudinal beam
9 inner sheet part
11 outer sheet part
13 outer skin sheet part
15 adhesive flange
17 reinforcement frame
19 vehicle upper support leg
21 lower vehicle support leg
23 support portion
25 adhesive portion
27 adhesive
29 fastening screw
31, 33 screw holes
35 screw nut
37 spacer
39 elastically flexible element
41 joining flank
Fc crash force

The invention claimed is:
1. A fastening arrangement with a roof-frame structure of a vehicle and a roof module, a roof-module carrier of which, in the assembled state, is adhesively bonded to an adhesive flange of the roof-frame structure with an interposed adhesive, wherein the roof-module carrier is additionally connected to the adhesive flange of the roof-frame structure by a screw connection, in which the roof module carrier is firmly clamped to the adhesive flange of the roof-frame structure by at least one fastening screw, wherein, to avoid contact corrosion and/or to reduce the component weight, the fastening screw is made from plastic; wherein between the adhesive flange and the roof-module carrier, spacers are positioned, which ensure a predefined layer thickness of the adhesive; and wherein the spacers are located in a longitudinal direction of the vehicle along the roof-frame structure in a region where the at least one fastening screw is not located.

2. The fastening arrangement according to claim 1, wherein the plastic is made of thermoplastic material, such as polyamide, polyphthalamide or another engineering plastic, or that the plastic is made of thermosetting material, such as epoxy, polyester, vinyl ester or the like.

3. The fastening arrangement according to claim 1, wherein to increase the rigidity or strength, and to provide a fastening screw of high strength class, reinforcing glass fibers are embedded in the plastic by forming a fiber composite plastic.

4. The fastening arrangement according to claim 1, wherein the adhesive flange of the roof-frame structure protrudes inwards towards the vehicle and/or the adhesive flange is aligned in a horizontal plane, and/or that the adhesive flange is essentially formed like an encircling frame, and/or that the roof-module carrier is designed as an essentially frame-like closed reinforcement frame which is supported on the adhesive flange with an adhesive connection and a screw connection.

5. The fastening arrangement according to claim 1, wherein the fastening screw is aligned in the vehicle vertical direction and/or that the fastening screw is guided with its screw shank through a screw hole of the adhesive flange and through a screw hole in the roof-module carrier and is screwed to a screw nut, the screw nut being a pierce nut, so that the adhesive flange and the roof module carrier are clamped between the screw head of the fastening screw and the nut.

6. The fastening arrangement according to claim 1, wherein the roof-frame structure has at least one lateral roof-frame longitudinal beam which extends in the vehicle longitudinal direction, and in that the roof-frame longitudinal beam consists of a cup-shaped inner vehicle sheet part, a cup-shaped outer vehicle sheet part and an outer skin sheet part which covers the outer sheet part, and that the outer sheet part, the inner sheet part and the outer skin sheet part are joined together with their longitudinal flanges on the inside of the vehicle to form a flange connection, and that the flange connection forms the adhesive flange.

7. The fastening arrangement according to claim 6, wherein the roof-frame longitudinal beam is part of a vehicle side structure into which a crash force can be introduced in the event of a side crash.

8. The fastening arrangement according to claim 7, wherein the fastening screw made of plastic has a reduced shearing strength compared to a conventional metal screw, and/or in that the fastening screw acts as a predetermined breaking point in the event of a side crash shears off or breaks early in the course of the crash, causing the roof module to detach from the roof-frame structure of the vehicle early on after the side crash.

9. A method for assembling a fastening arrangement according to claim 1 comprising:

in a first process step, the roof module is provided as a separate pre-assembly unit, on the roof-module carrier of which the adhesive can be applied, in a second process step, the roof module is positioned on the adhesive flange, and in a third process step, the roof module is screwed to the adhesive flange of the roof-frame, and the screw connection secures the position of the roof module during a hardening phase of the adhesive in the vertical direction of the vehicle, and/or after hardening has taken place, the screw connection is largely functionless and the connection strength between the roof module and the adhesive flange is substantially ensured by the adhesive connection.

10. The fastening arrangement according to claim 2, wherein to increase the rigidity or strength to provide a fastening screw of high strength class, reinforcing fibers comprising glass fibers, are embedded in the plastic by forming a fiber composite plastic.

11. The fastening arrangement according to claim 2, wherein the adhesive flange of the roof-frame structure protrudes inwards towards the vehicle and/or the adhesive flange is aligned in a horizontal plane, and/or that the adhesive flange is essentially formed like an encircling frame, and/or that the roof-module carrier is designed as an essentially frame-like closed reinforcement frame which is supported on the adhesive flange with an adhesive connection and a screw connection.

12. The fastening arrangement according to claim 3, wherein the adhesive flange of the roof-frame structure protrudes inwards towards the vehicle and/or the adhesive flange is aligned in a horizontal plane, and/or that the adhesive flange is essentially formed like an encircling frame, and/or that the roof-module carrier is designed as an essentially frame-like closed reinforcement frame which is supported on the adhesive flange with an adhesive connection and a screw connection.

13. The fastening arrangement according to claim 2, wherein the fastening screw is aligned in the vehicle vertical direction and/or that the fastening screw is guided with its screw shank through a screw hole of the adhesive flange and through a screw hole in the roof-module carrier and is screwed to a screw nut, the screw nut being a pierce nut, so that the adhesive flange and the roof module carrier are clamped between the screw head of the fastening screw and the nut.

14. The fastening arrangement according to claim 3, wherein the fastening screw is aligned in the vehicle vertical direction and/or that the fastening screw is guided with its screw shank through a screw hole of the adhesive flange and through a screw hole in the roof-module carrier and is screwed to a screw nut, the screw nut being a pierce nut, so that the adhesive flange and the roof module carrier are clamped between the screw head of the fastening screw and the nut.

15. The fastening arrangement according to claim 4, wherein the fastening screw is aligned in the vehicle vertical direction and/or that the fastening screw is guided with its screw shank through a screw hole of the adhesive flange and through a screw hole in the roof-module carrier and is screwed to a screw nut, the screw nut being a pierce nut, so that the adhesive flange and the roof module carrier are clamped between the screw head of the fastening screw and the nut.

16. The fastening arrangement according to claim 2, wherein the roof-frame structure has at least one lateral roof-frame longitudinal beam which extends in the vehicle longitudinal direction, and in that the roof-frame longitudinal beam consists of a cup-shaped inner vehicle sheet part, a cup-shaped outer vehicle sheet part and an outer skin sheet part which covers the outer sheet part, and that the outer sheet part, the inner sheet part and the outer skin sheet part are joined together with their longitudinal flanges on the inside of the vehicle to form a flange connection, and that the flange connection forms the adhesive flange.

17. The fastening arrangement according to claim 3, wherein the roof-frame structure has at least one lateral roof-frame longitudinal beam which extends in the vehicle longitudinal direction, and in that the roof-frame longitudinal beam consists of a cup-shaped inner vehicle sheet part, a cup-shaped outer vehicle sheet part and an outer skin sheet part which covers the outer sheet part, and that the outer sheet part, the inner sheet part and the outer skin sheet part are joined together with their longitudinal flanges on the inside of the vehicle to form a flange connection, and that the flange connection forms the adhesive flange.

18. The fastening arrangement according to claim 4, wherein the roof-frame structure has at least one lateral roof-frame longitudinal beam which extends in the vehicle longitudinal direction, and in the roof-frame longitudinal beam consists of a cup-shaped inner vehicle sheet part, a cup-shaped outer vehicle sheet part and an outer skin sheet part which covers the outer sheet part, and that the outer sheet part, the inner sheet part and the outer skin sheet part are joined together with their longitudinal flanges on the inside of the vehicle to form a flange connection, and that in particular the flange connection forms the adhesive flange.

19. The fastening arrangement according to claim 5, wherein the roof-frame structure has at least one lateral roof-frame longitudinal beam which extends in the vehicle longitudinal direction, and in that the roof-frame longitudinal beam consists of a cup-shaped inner vehicle sheet part, a cup-shaped outer vehicle sheet part and an outer skin sheet part which covers the outer sheet part, and that the outer sheet part, the inner sheet part and the outer skin sheet part are joined together with their longitudinal flanges on the inside of the vehicle to form a flange connection, and that the flange connection forms the adhesive flange.

* * * * *